US006808384B1

(12) United States Patent
Jordan et al.

(10) Patent No.: US 6,808,384 B1
(45) Date of Patent: Oct. 26, 2004

(54) INTERNAL VIBRATION DEVICE WITH VARIABLE VIBRATION AMPLITUDE

(75) Inventors: Peter Jordan, deceased, late of Pfaffenhofen (DE), by Christina Jordan, administratorix; Franz Beierlein, Germering (DE); Johann Schindlbeck, Haag/Amper (DE)

(73) Assignee: Wacker Construction Equipment AG, Munich (DE)

( * ) Notice: Subject to any disclaimer, the term of this patent is extended or adjusted under 35 U.S.C. 154(b) by 0 days.

(21) Appl. No.: 09/913,216

(22) PCT Filed: Apr. 7, 2000

(86) PCT No.: PCT/EP00/03138

§ 371 (c)(1),
(2), (4) Date: Jan. 28, 2002

(87) PCT Pub. No.: WO00/61344

PCT Pub. Date: Oct. 19, 2000

(30) Foreign Application Priority Data

Apr. 12, 1999 (DE) ........................................ 199 16 378

(51) Int. Cl.[7] ................................................ B29C 43/32

(52) U.S. Cl. ....................... 425/432; 425/456; 366/128; 310/81

(58) Field of Search ................................. 425/456, 432; 366/123, 128; 310/81; 404/116, 133, 133.05

(56) References Cited

U.S. PATENT DOCUMENTS

| | | | | |
|---|---|---|---|---|
| 2,278,839 A | * | 4/1942 | Douglass | 366/123 |
| 2,454,620 A | * | 11/1948 | Wilde | 366/121 |
| 2,771,279 A | * | 11/1956 | Dearden | 74/87 |
| 3,202,402 A | * | 8/1965 | Giert-Hedstrom | 366/123 |
| 6,084,327 A | * | 7/2000 | Steffen | 310/81 |
| 6,155,708 A | * | 12/2000 | Lindley | 366/123 |

FOREIGN PATENT DOCUMENTS

| | | |
|---|---|---|
| CH | 349 432 | 11/1960 |
| DE | 73 16 210 | 8/1973 |
| DE | 24 19 458 | 11/1975 |
| GB | 767 960 | 2/1957 |

* cited by examiner

*Primary Examiner*—James P. Mackey
*Assistant Examiner*—Thu Khanh T. Nguyen
(74) *Attorney, Agent, or Firm*—Boyle Fredrickson Newholm Stein & Gratz S.C.

(57) ABSTRACT

The invention relates to an internal vibration device having an electrical motor mounted in a vibrating unit housing and having a rotating device comprising an out of-balance mass that is also mounted in the vibrating unit housing. The invention is characterized in that eccentricity of a center of gravity of the out-of-balance mass can be varied relative to the axis of rotation of said out-of-balance mass depending on the direction of rotation of the electrical motor. Said internal vibration device is suitable both for compacting unset concrete and for distributing concrete in the formwork.

16 Claims, 2 Drawing Sheets

INTERNAL VIBRATION DEVICE WITH VARIABLE VIBRATION AMPLITUDE

BACKGROUND OF THE INVENTION

1. Field of the Invention

The invention relates to an internal jolting device according to the preamble of patent claim 1.

2. Description of the Related Art

Internal jolting devices, also designated as internal jolters or internal vibrators, are generally known and serve for the compacting of liquid concrete. For this purpose, a jolting cylinder, in which an electric motor and an unbalanced mass driven by the latter are accommodated, is fastened to the end of a relatively long or else relatively short tube in a way corresponding to a tube-type or bar-type jolter. The unbalanced mass rotating at a very high rotational speed generates an oscillation which is coordinated with the concrete to be compacted and is transmitted to the fresh concrete after the jolting cylinder has penetrated into the latter, with the result that air inclusions and pore formation associated with these are eliminated and therefore the bulk density of the concrete is increased, so that the desired quality and strength can be achieved. Appliances of this type have proved extremely successful in practice.

Furthermore, internal jolters based on a similar principle of construction are known, in which a relatively large unbalanced mass is driven at relatively low rotational speed, with the result that a higher oscillation amplitude of the jolting cylinder can be generated. Appliances of this type are suitable less for the compaction of concrete than for the distribution of concrete.

So that the work of processing concrete can be carried out optimally on the construction site, it is therefore necessary to have both types of appliance, thus requiring not only a high material outlay in terms of available appliances, but also the frequent conversion and connection of different types of appliance.

DE-U-73 16 210 discloses an internal jolter with an electric motor which is arranged in a jolting housing and which drives an unbalanced mass in rotation. The eccentricity of the center of gravity of the unbalanced mass can be changed with respect to the axis of rotation of the unbalanced mass, in such a way that a decrease in rotational speed occurring during a decrease in rotational speed when the jolting housing penetrates into the concrete gives rise at the same time to a reduction in the unbalanced mass, so that the decrease in rotational speed can be directly compensated again. It thereby becomes possible to maintain the internal jolter largely at the same rotational speed during the compaction of concrete.

DD 269 568 A1 discloses an adjustable vibrator, in which, in order to set a maximum and minimum exciting force, two unbalanced masses are arranged on a shaft in such a way that one unbalanced mass is mounted fixedly relative to the shaft and the other unbalanced mass is mounted rotably on the shaft. By a change in direction of rotation, the position of the rotable unbalanced mass changes in relation to the fixed unbalanced mass, thus resulting at the same time in a variation in the exciting forces.

OBJECTE AND SUMMARY OF THE INVENTION

The object on which the invention is based is to specify an internal jolter, by means of which fresh concrete can not only be compacted, but also distributed.

The solution for achieving the object is specified in patent claim 1. Advantageous developments of the invention may be gathered from the dependent claims.

By the variation in the eccentricity of a center of gravity of the unbalanced mass with respect to an axis of rotation of the unbalanced mass when the mass of the unbalanced mass is invariable as a consequence of construction, the so-called mr value (the product of the mass and the radius of the center of gravity), which is critical for the oscillation amplitude, can also be varied. At a low mr value, the amplitude is also low, this being preeminently suitable for the compaction of fresh concrete. However, when the mr value rises as a result of a variation in the eccentricity of the center of gravity, the oscillation amplitude also rises, and consequently the proper motion of the jolting cylinder in the fresh concrete. The concrete is thereby less compacted than it is pushed and consequently can easily be distributed in the formwork.

In a preferred embodiment of the invention, the eccentricity can be varied between at least two fixed values, one value being particularly suitable for the compacting work and another value for the distributing work. It is particularly advantageous if the rotational speed of the electric motor and consequently the rotational speed of the unbalanced mass are variable. Consequently, each eccentricity of the center of gravity can be assigned an optimum rotary frequency which is obtained, inter alia, due to the action of the jolting cylinder in the fresh concrete. Suitable values for this purpose can be determined within the framework of simple preliminary tests.

According to the invention, the electric motor is fed by a frequency converter which can be changed over in order to generate at least two different electrical frequencies. When the frequency converter is arranged in a switch housing of the internal jolting device, the operating elements necessary for the changeover can also easily be mounted on the switch housing.

According to a particular development of the invention, the direction of rotation of the electric motor can be changed over and the rotary device has a shaft which is coupled to the electric motor and on which two mass elements forming the unbalanced mass are arranged, in such a way that a first mass element is fastened to the shaft and a second mass element is rotable on the shaft relative to the first mass element between two end positions.

The first mass element always corotates with the direction of rotation of the shaft predetermined by the electric motor. When the direction of rotation is reversed, the first mass element therefore immediately follows this reversal in direction of rotation. The second mass element which freely rotates along the shaft within specific limits, to be precise the two end positions, remains in the initial position due to its inertia and is therefore rotated relative to the first mass element on the shaft Only when the second end position, which may be defined, for example, via a driver, is reached does the second mass element also follow the then reversed direction of rotation of the first mass element. By means of a suitable arrangement and mass distribution on the mass elements, it is thereby possible to ensure that the overall center of gravity of the unbalanced mass resulting from the two mass elements has different eccentricities and therefore different mr values in the two end positions.

BRIEF DESCRIPTION OF THE DRAWINGS

This and further features and advantages of the invention are explained in more detail below by means of an example with the aid of the accompanying figures in which:

FIG. 1 shows a front part of an internal jolter according to the invention

DETAILED DESCRIPTION OF THE PREFERRED EMBODIMENTS

Figure 1:
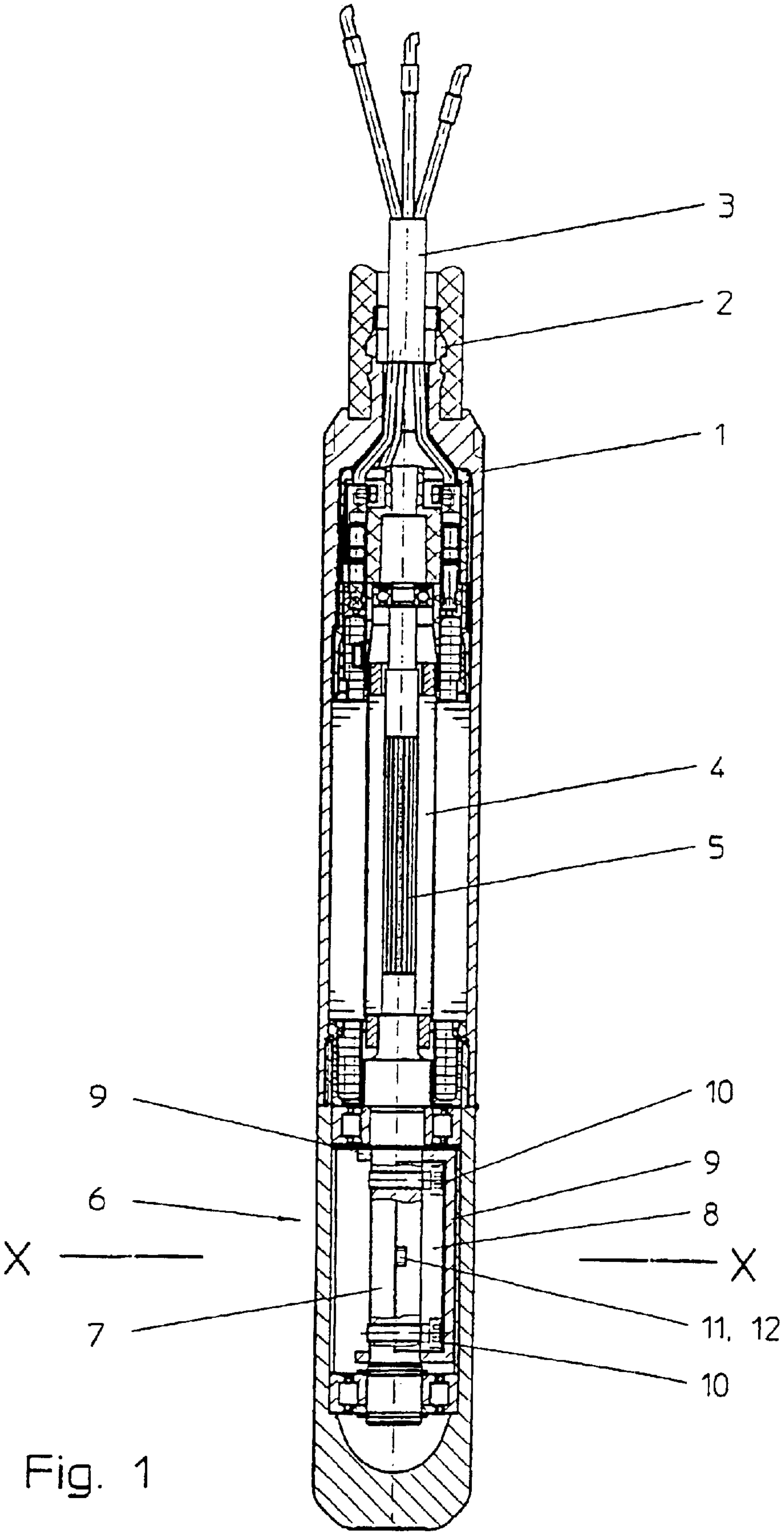
FIG. 1 shows a longitudinal section through a jolting cylinder of an internal jolting device according to the invention.

A jolting cylinder 1, formed conventionally from metal and serving as a jolting housing, is fastened to one end of a protective tube 2 which conventionally has a length of between 1.5 meters and 6 meters and is illustrated, only greatly reduced, in FIG. 1. In order to operate the internal jolter, the operator holds either the protective tube 2 or a handle fastened to the other end of the protective tube 2 and not illustrated in FIG. 1.

Inside the protective tube 2 runs an electrical feedline 3 for an electric motor 4, known per se, which is arranged inside the jolting cylinder 1.

A rotary device 6 is mounted in the polygonation of a rotary shaft 5 belonging to the electric motor 4. The rotary device 6 consists essentially of a shaft 7 connected in one piece to the rotor shaft 5, and a first mass element 8 fastened to the shaft 7 and a second mass element 9 likewise arranged on the shaft 7. While the first mass element 8 is connected fixedly to the shaft 7 by means of screws 10, the second mass element 9 is freely rotable on the shaft 7 relative to the first mass element 8 within specific limits.

Figure 2:
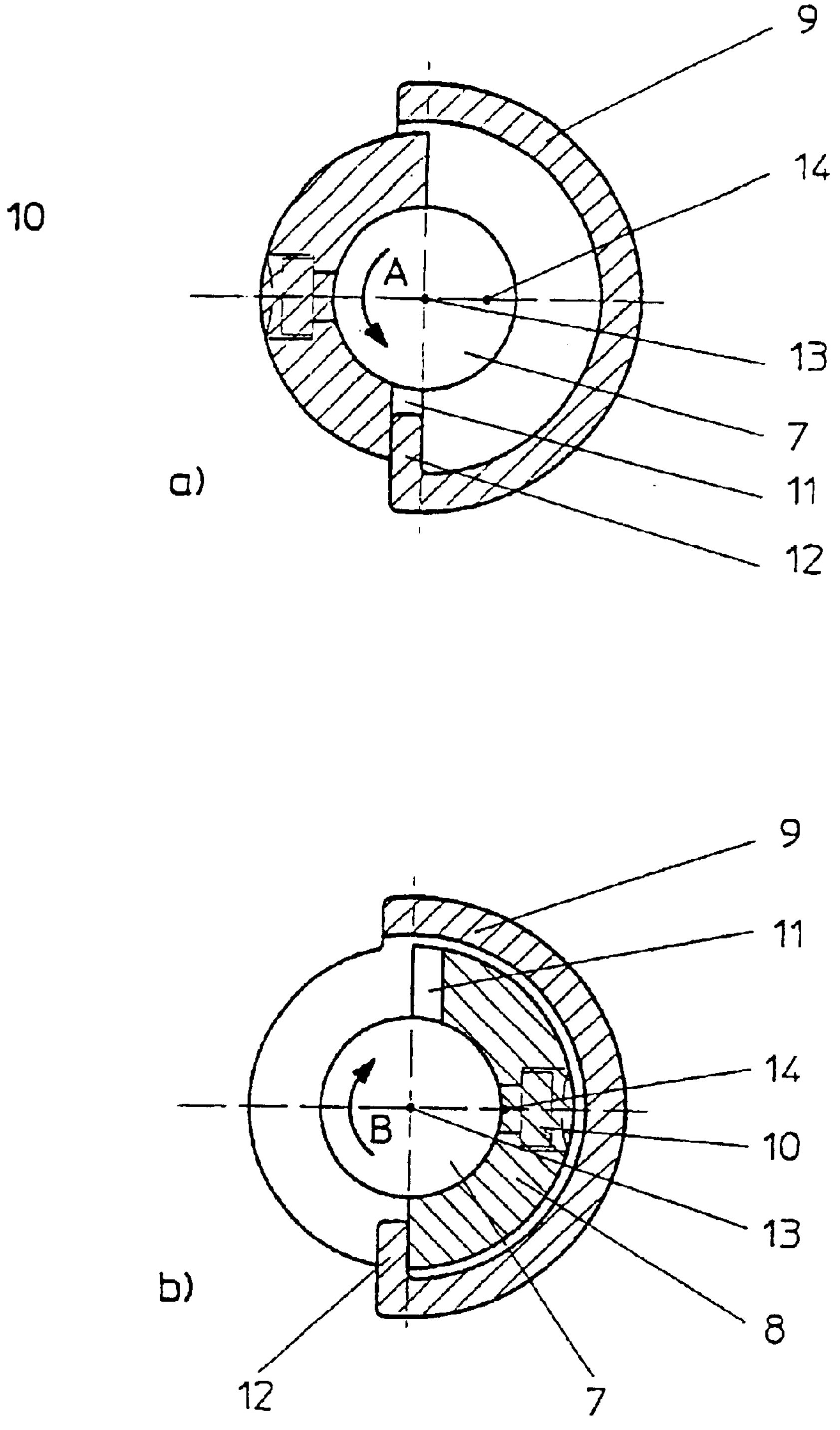
FIGS. 2*a* and 2*b* show a cross section through two mass elements moveable relative to one another, in two different positions.

The limits are defined by two end positions which are illustrated in FIGS. 2*a* and 2*b* showing in each case cross sections along the line X—X in FIG. 1. For this purpose, the first mass element 8 has formed in it a recess 11, to which a nose 12 belonging to the second mass element 9 engages in the position shown in FIG. 2*a*.

In the position shown in FIG. 2*b*, a side of the first mass element 8 which is located opposite the recess 11 butts against the nose 12.

The change between the two positions shown in FIGS. 2*a* and 2*b* takes place as follows:

In FIG. 2*a*, the shaft 7 with the first mass element 8 rotates in the direction of an arrow A. As a result, the first mass element 8, by means of its recess 11, drives the second mass element 9 via the nose 12.

During reversing of the direction of rotation of the electric motor 4, according to FIG. 2*b*, the shaft 7 rotates in the direction of an arrow 13. The second mass element 9, due to its inertia, remains in the position shown in FIG. 2*a*, while the first mass element 8 connected fixedly to the shaft 7 likewise rotates in the direction B.

After a rotation of about 180°, the side of the first mass element 8 which is located opposite the recess 11 butts against the nose 12 and drives the second mass element 9 which then likewise follows the rotational movement in the direction B.

While, in the position shown in FIG. 2*a*, the individual centers of gravity of the two mass elements 8 and 9 are located opposite one another with respect to an axis of rotation 13 of the shaft 7, in the position shown in FIG. 2*b* they are located on the same side with respect to the axis of rotation 13. The result of this is that an overall center of gravity 14, indicated by a dot, of the unbalanced mass formed by the two mass elements 8 and 9 has a lower eccentricity with respect to the axis of rotation 13 in the position according to FIG. 2*a* than in the position shown in FIG. 2*b*.

The variation in the position of the center of gravity, that is to say the variation in the eccentricity of the center of gravity 14, causes the oscillation amplitude of the oscillation generated by the unbalanced mass and consequently of the entire jolting cylinder 1 to change. When the eccentricity is low, the so-called mr value is also low and the oscillation amplitude is lower. This state according to FIG. 2*a* is particularly suitable for the compaction of concrete.

If, however, according to the position in FIG. 2*b*, the eccentricity of the center of gravity is high and therefore the mr value is high, the oscillation amplitude is also high, this advantageously being suitable for the distribution of fresh concrete.

It became clear that, for particularly effective work to be carried out, also only specific frequency ranges and therefore rotational speeds of the electric motor 4 are suitable for specific eccentricities or oscillation amplitudes. The electric motor 4 is conventionally a brushless motor fed by a frequency converter which is not illustrated. The frequency converter makes available, for example in the case of a voltage of 42 volt, an electrical frequency of 200 hertz which makes it possible to have a motor rotational speed of 12000 $min^{-1}$ and therefore an oscillation frequency of 200 hertz, this being particularly suitable for the compaction of concrete.

According to the invention, the frequency converter can be changed over between at least two frequency values, so that, in addition to the high frequency of 200 hertz already mentioned, it also makes available a lower frequency in the range of 100 to 150 hertz, corresponding to a motor rotational speed of 6000 to 9000 $min^{-1}$, this being particularly suitable for the distribution of fresh concrete.

Since, for the distribution of concrete, not only the frequency is to be lower, but also the oscillation amplitude higher, it is particularly expedient also to link the reversal in rotational speed to the frequency changeover, in order to achieve the necessary higher eccentricity of the center of gravity.

In the position shown in FIG. 2*a*, therefore, the electric motor 4 is supplied with a high electrical frequency, while it is excited at a lower frequency for the position shown in FIG. 2*b*.

Insofar as is technically expedient, the frequency converter may, of course, also make available more than two different frequencies. The design of a frequency converter of this type is known to a person skilled in the art and therefore does not have to be dealt with in any more detail at this juncture.

The changeover between the frequencies advantageously takes place on a switch housing, not illustrated, of the internal jolter, on which a mains switch is also provided. If necessary, a switch for reversing the direction of rotation may also be provided there.

The implementation, selected in the preferred embodiment shown in the figures, for varying the eccentricity of the center of gravity constitutes only one example. It is readily possible for a person skilled in the art also to apply the invention to other adjusting mechanisms. Thus, for example, the variation in the eccentricity of the center of gravity could be controlled as a function of the rotational speed, that is to say of the frequency. It is possible, furthermore, to bring about the mass displacement necessary for varying the eccentricity of the center of gravity with the aid of electromechanical actuators.

The invention described can also be implemented in internal jolting devices of a different type. These are, for example, internal jolters, in which the electric motor for driving the oscillation exciter is not arranged in the jolting cylinder 1, but externally. Depending on the particular type, the electric motor may stand at the edge of the work area or be carried by the operator, the rotational movement being transmitted from the electric motor to the oscillation exciter via a flexible shaft guided in the protective tube 2. Since, according to the invention, the direction of rotation of the electric motor can be capable of being changed over, the flexible shaft must be suitable for transmitting the rotational movement in both directions of rotation. Various possibilities for this are familiar to a person skilled in the art.

What is claimed is:

1. An internal jolting device comprising:

an electric motor;

a jolting housing; and a rotary device which is arranged in the jolting housing, is driven by the electric motor and has an unbalanced mass;

the eccentricity of a center of gravity of the unbalanced mass with respect to an axis of rotation of the unbalanced mass being capable of being varied;

wherein the electric motor is fed by a frequency converter which can be changed over in order to generate at least two different electrical frequencies for the electric motor;

the direction of rotation of the electric motor can be changed over, each direction of rotation being assigned one of the electrical frequencies; and the eccentricity of the center of gravity is capable of being varied by way of the changeover of the direction of rotation of the electric motor.

2. The internal jolting device as claimed in claim 1, wherein the eccentricity is capable of being varied between at least two fixed values.

3. The internal jolting device as claimed in claim 1, wherein the rotational speed of the electric motor is variable.

4. The internal jolting device as claimed in claim 1, wherein the frequency converter is arranged in a switch housing of the internal jolting device.

5. The internal jolting device as claimed in claim 1, wherein the rotary device has a shaft which is coupled to the electric motor and on which two mass elements forming the unbalanced mass are arranged in such a way that a first mass element is fastened to the shaft and a second mass element is rotable on the shaft relative to the first mass element between two end positions.

6. The internal jolting device as claimed in claim 1, wherein the electric motor is arranged in the jolting housing.

7. The internal jolting device as claimed in claim 1, wherein a flexible shaft is provided between the electric motor and the rotary device.

8. The internal jolting device as claimed in claim 7, wherein the electric motor is arranged in a motor housing separate from the jolting housing.

9. An internal jolting device comprising:

a reversible electric motor;

a jolting housing;

a rotary device which is arranged in the jolting housing, which is driven by the electric motor, and which has an unbalanced mass, the eccentricity of a center of gravity of the unbalanced mass with respect to an axis of rotation of the unbalanced mass being variable depending on a rotational direction of the unbalanced mass; and a frequency converter which supplies electrical power to the electric motor and which can be changed over in order to generate at least two different electrical frequencies for the electric motor, each of which corresponds to a respective direction of rotation of the electric motor.

10. The internal jolting device as claimed in claim 9, wherein the eccentricity of the unbalanced mass is capable of being varied between at least two fixed values.

11. The internal jolting device as claimed in claim 9, wherein the rotational speed of the electric motor is variable.

12. The internal jolting device as claimed in claim 9, further comprising a switch housing in which the frequency converter is arranged.

13. The internal jolting device as claimed in claim 9, wherein the rotary device has a shaft which is coupled to the electric motor and on which first and second mass elements forming the unbalanced mass are arranged in such a way that the first mass element is fastened to the shaft and the second mass element is rotatable on the shaft, relative to the first mass element, between two end positions.

14. The internal jolting device as claimed in claim 9, wherein the electric motor is arranged in the jolting housing.

15. The internal jolting device as claimed in claim 9, further comprising a flexible shaft located between the electric motor and the rotary device.

16. The internal jolting device as claimed in claim 15, further comprising a motor housing in which the electric motor is arranged, the motor housing being separate from the jolting housing.

* * * * *